US010341514B2

(12) United States Patent
Yamada

(10) Patent No.: US 10,341,514 B2
(45) Date of Patent: Jul. 2, 2019

(54) IMAGE PROCESSING APPARATUS, CONTROL METHOD FOR THE IMAGE PROCESSING APPARATUS, AND STORAGE MEDIUM

(71) Applicant: CANON KABUSHIKI KAISHA, Tokyo (JP)

(72) Inventor: Masayuki Yamada, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 90 days.

(21) Appl. No.: 15/458,380

(22) Filed: Mar. 14, 2017

(65) Prior Publication Data

US 2017/0272594 A1 Sep. 21, 2017

(30) Foreign Application Priority Data

Mar. 17, 2016 (JP) ................................ 2016-054387

(51) Int. Cl.
*H04N 1/00* (2006.01)

(52) U.S. Cl.
CPC ....... *H04N 1/00514* (2013.01); *H04N 1/0097* (2013.01); *H04N 1/00482* (2013.01); *H04N 2201/0094* (2013.01)

(58) Field of Classification Search
CPC ............. H04N 1/00514; H04N 1/0097; H04N 1/00482; H04N 2201/0094
See application file for complete search history.

(56) References Cited

U.S. PATENT DOCUMENTS

| | | | | |
|---|---|---|---|---|
| 8,699,060 B2 * | 4/2014 | Furutani | ............ | H04N 1/32122 358/1.15 |
| 2006/0039036 A1 * | 2/2006 | Tsuboi | ............... | H04N 1/00912 358/403 |
| 2006/0221372 A1 * | 10/2006 | Onishi | .................. | G06F 3/1204 358/1.13 |
| 2007/0183002 A1 * | 8/2007 | Corona | .............. | H04N 1/00795 358/474 |
| 2008/0189716 A1 * | 8/2008 | Nakahara | .............. | G06F 21/608 718/105 |
| 2008/0263036 A1 * | 10/2008 | Yamamoto | ........ | G06F 17/30011 |
| 2009/0204804 A1 * | 8/2009 | Okubo | .................... | G06F 21/31 713/100 |
| 2011/0128574 A1 * | 6/2011 | Kouno | ............... | H04N 1/00244 358/1.15 |

(Continued)

FOREIGN PATENT DOCUMENTS

| | | |
|---|---|---|
| JP | 2007251432 A | 9/2007 |
| JP | 2014218075 A | 11/2014 |

*Primary Examiner* — Ming Y Hon

(74) *Attorney, Agent, or Firm* — Canon U.S.A., Inc. IP Division

(57) ABSTRACT

An image processing apparatus includes a display unit configured to display a setting screen of a job for performing setting of a plurality of setting items related to the job, a memory that stores setting values of the setting items related to the set job in accordance with logout of a user who has logged in to the image processing apparatus, and a control unit configured to perform control so as to display the setting screen of the set job where the setting value stored in the memory is read out and set with regard to the setting item related to the job except for a previously determined setting item in a case where the logged-out user logs in again.

9 Claims, 14 Drawing Sheets

(56) References Cited

U.S. PATENT DOCUMENTS

2012/0005544 A1* 1/2012 Matsumoto ......... G06F 11/0733
714/57
2013/0104050 A1* 4/2013 Wang .................... G06F 3/0484
715/744
2013/0208292 A1* 8/2013 Akari ...................... G06F 3/121
358/1.13
2013/0215461 A1* 8/2013 Yasukawa .......... H04N 1/00408
358/1.15
2014/0300920 A1* 10/2014 Hayashi ............. H04N 1/00413
358/1.14

* cited by examiner

| TYPE | SENDING DESTINATION |
|---|---|
| FAX | 03-xxxx-xxxx |
| E-MAIL | xxx@yyy.zzz |
| | |
| | |

| SETTING ITEM | VALUE |
|---|---|
| COLOR MODE | COLOR |
| RESOLUTION | NORMAL |
| DUPLEX SETTING | SINGLE-SIDED |
| ⋮ | |

FIG. 5C

| SETTING ITEM | VALUE | |
|---|---|---|
| SENDING DESTINATION DELETION | DELETE | 503 |
| SETTING VALUE DELETION | NO DELETION | 504 |
| SETTING VALUE RESTORATION | RESTORE | 505 |

⋮

IMAGE PROCESSING APPARATUS, CONTROL METHOD FOR THE IMAGE PROCESSING APPARATUS, AND STORAGE MEDIUM

BACKGROUND

Field of the Disclosure

The present disclosure relates to an image processing apparatus, a control method for the image processing apparatus, and a storage medium.

Description of the Related Art

In recent years, an image processing apparatus has been devised which stores a setting value of a setting item related to a job set when a user logs out from the image processing apparatus and displays a setting screen in which the setting value related to the job stored after the logged-out user logins in again is set.

When the image processing apparatus having the above-described setting value restoration function is used, the following configuration can be realized.

For example, the user logs in to the image processing apparatus and then logs out halfway through setting process related to a job such as a setting of a sending destination or a setting of a sheet size to be used. When a setting screen where a setting value set at the time of the logout is set is displayed on a display unit of the image processing apparatus after the user who logs out halfway through the setting process logs in again, it is possible to omit work for the user to perform the setting again that has been previously carried out.

As described above, when the image processing apparatus stores the setting set at the time of the logout, the user can use the setting screen where the setting value set at the time of the logout is set in a case where the user logs in again.

Japanese Patent Laid-Open No. 2014-218075 describes an image processing apparatus that displays a setting screen where all of stored setting values have been already set after the user who has performed the job setting logs in again.

Japanese Patent Laid-Open No. 2007-251432 describes an image processing apparatus that inquires the user to choose a stored setting item and display a setting screen where a setting value of the chosen setting item is set after the user logs in again.

However, according to Japanese Patent Laid-Open No. 2014-218075, the setting screen where the setting value stored in the image processing apparatus has been already set is displayed also with regard to a setting item where the user does not desire to automatically perform the setting of the stored setting value.

The setting item where the user does not desire to display the screen on which the automatically stored setting has been already set includes, for example, a sending destination or the like of a facsimile (FAX)/send function for performing sending of FAX data or sending of an electronic mail (E-mail).

In the image processing apparatus that displays the setting screen on which the sending destination stored in the FAX/send function has been automatically set, the following issue occurs.

It is assumed that the user sets a plurality of setting items including the sending destination on the setting screen of the FAX/send function and logs out. According to the above-described image processing apparatus, when the user logs in again, even in a case where the user attempts to send a facsimile to a sending destination different from the sending destination at the time of the logout, the setting screen where the sending destination stored in the image processing apparatus is set is displayed. If the user sends a job without noticing that the same sending destination as the sending destination at the time of the logout is set, the facsimile is sent to a sending destination different from the sending destination intended by the user, and erroneous sending occurs.

In this manner, with regard to part of the setting items, when the setting value stored in the image processing apparatus is automatically set and the job is executed, this situation may lead to execution of the job in a setting unintended by the user.

As in Japanese Patent Laid-Open No. 2007-251432, the user determines whether or not the setting value is set for each setting value, and it is possible to avoid the automatic setting of the setting value at the time of the logout. However, according to Japanese Patent Laid-Open No. 2007-251432, the user is also requested to issue a restoration instruction when the user logs in again with respect to the setting item where the setting value at the time of the logout may be set without the setting instruction of the setting value stored by the user, which takes time.

SUMMARY

In view of the above-described circumstances, according to an aspect of the present disclosure, there is provided an the image processing apparatus including a display unit configured to display a setting screen of a job for performing setting of a plurality of setting items related to the job, a memory that stores setting values of the setting items related to the set job in accordance with logout of user who has logged in to the image processing apparatus, and a control unit configured to perform control so as to display the setting screen of the set job where the setting value stored in the memory is read out and set with regard to the setting item related to the job except for a previously determined setting item in a case where the logged-out user logs in again, wherein the display unit and the control unit are implemented by at least one processor.

Further features of the present disclosure will become apparent from the following description of exemplary embodiments with reference to the attached drawings.

BRIEF DESCRIPTION OF THE DRAWINGS

FIGS. 5A to 5C are schematic diagrams of setting values of respective setting items stored in a RAM according to one or more aspects of the present disclosure.

DESCRIPTION OF THE EMBODIMENTS

First Exemplary Embodiment

Hereinafter, exemplary embodiments of the present disclosure will be described with reference to the drawings.

Figure 1:
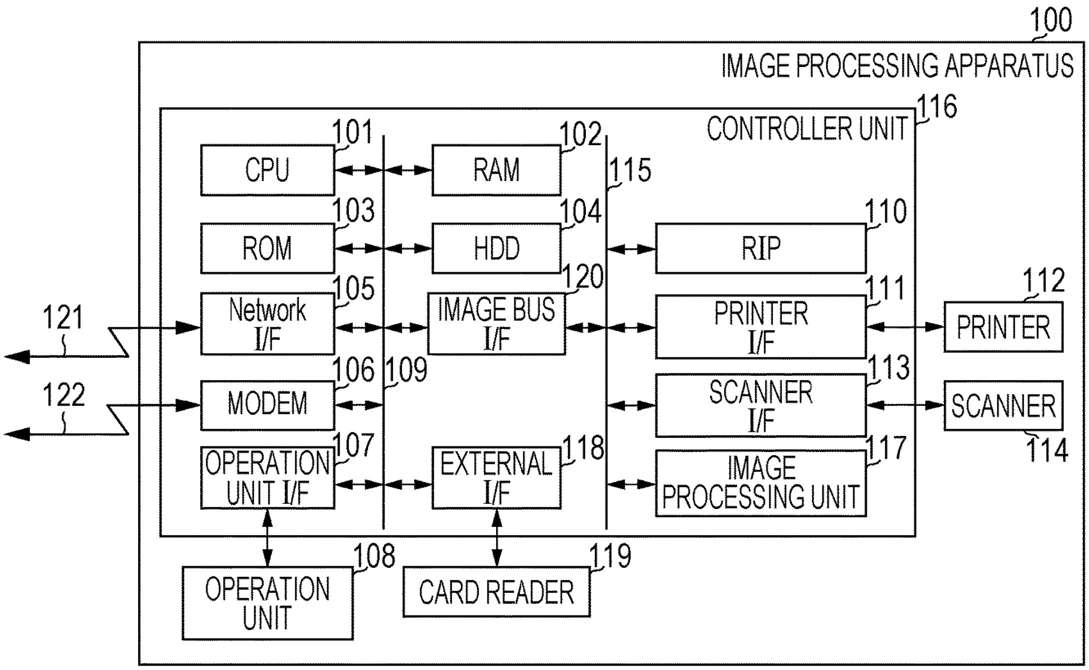
FIG. 1 illustrates a configuration of an image processing apparatus according to one or more aspects of the present disclosure.

FIG. 1 is a block diagram illustrating an example of a hardware configuration of an image processing apparatus 100 according to one or more aspects of the present disclosure.

In FIG. 1, a controller unit 116 is connected to a scanner 114 functioning as an image input device and a printer 112 functioning as an image output device. The controller unit 116 performs exchange of image data with another information processing apparatus or image processing apparatus via a LAN 121 or a public line 122. A central processing unit (CPU) 101 in the controller unit 116 is a processor configured to control the system. A random access memory (RAM) 102 is a system work memory used by the CPU 101 to operate. The RAM 102 is used as an image memory for temporarily recording a program memory for recording a program or image data. A ROM 103 stores a boot program of the system and various control programs. A hard disc drive (HDD) 104 stores various programs for controlling the system, image data, and the like.

An operation unit interface (operation unit I/F) 107 is an interface unit with respect to an operation unit 108 and outputs image data to be displayed on the operation unit 108. The operation unit I/F 107 also uses the operation unit 108 to send information input by a user to the CPU 101. It should be noted that the operation unit 108 is provided with a display unit including a touch panel and performs various instructions when the user presses a button displayed on the display unit by a finger or the like.

A network interface (network I/F) 105 is connected to the LAN 121 and performs input and output of data with an external apparatus. A modem 106 is connected to the public line 122 and performs input and output of data such as sending and reception of FAX. An external interface (external I/F) 118 is an interface unit configured to accept an external input such as USB, IEEE1394, printer port, or RS-232C. It should be noted that, according to the present exemplary embodiment, a card reader 119 configured to read an IC card is connected to the external I/F 118. The CPU 101 can control reading of information from the IC card by the card reader 119 via the external I/F 118 and obtain information read from the IC card. The above-described devices are arranged on a system bus 109.

An image bus interface (image bus I/F) 120 is a bus bridge configured to connect the system bus 109 to an image bus 115 where the image data is transferred at a high speed and convert a data structure.

The image bus 115 is constituted by a PCI bus or IEEE1394. The following devices are connected on the image bus 115. A raster image processor (RIP) 110 rasterizes, for example, vector data such as PDL code into bitmap image. A printer interface (printer I/F) 111 connects the printer 112 to the controller unit 116. A scanner interface (scanner I/F) 113 connects the scanner 114 to the controller unit 116.

An image processing unit 117 performs correction, process, and editing of input image data. The image processing unit 117 also performs printer correction, resolution conversion, and the like on printed output image data. Furthermore, the image processing unit 117 performs rotation of the image data and compression and decompression for compressing and decompressing multi-values image data to JPEG and binary image data to JBIG, MMR, MH, or the like.

The scanner 114 irradiates an image on a sheet corresponding to an original with light to be scanned by a CCD line sensor, so that the original is converted into an electric signal as raster image data. The original is set in a tray of a document feeder that is not illustrated in the drawing, and the user instructs start of image reading by using the operation unit 108. As a result, the CPU 101 supplies an instruction to the scanner 114, and the document feeder reads the original one by one. The printer 112 converts the raster image data into the image on the sheet. Methods for the printer include an electrophotographic method using a photosensitive drum or a photoconductive belt, an inkjet method in which ink is ejected from a minute nozzle array to directly print an image on a sheet, and the like. An apparatus using any of the methods may be used as long as an embodiment of the present disclosure can be implemented. Activation of a printing operation is started in response to an instruction from the CPU 101. It should be noted that the printer 112 is provided with a plurality of feed cassettes (not illustrated) so that different sheet sizes or different sheet orientations can be selected.

Figure 11:
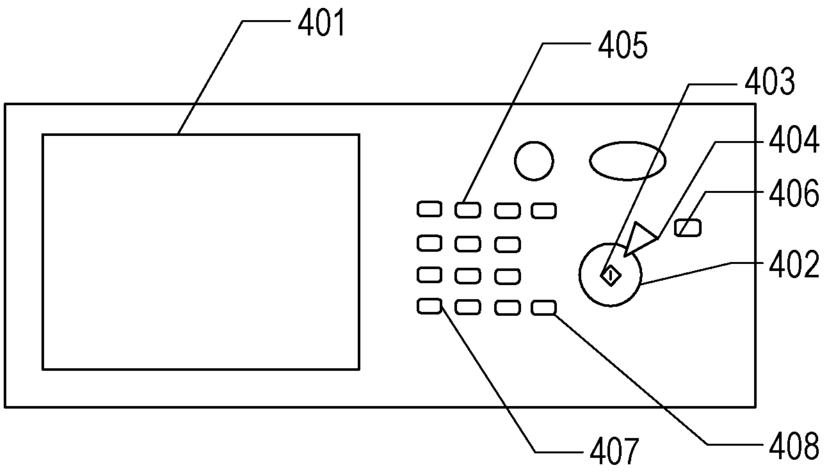
FIG. 11 illustrates an example of an operation unit according to one or more aspects of the present disclosure.

As illustrated in FIG. 11, the operation unit 108 includes a liquid crystal display (LCD) display unit 401, and a touch panel sheet is affixed onto the LCD. The CPU 101 displays a setting screen of the system on the LCD display unit 401. Information indicating a location pressed by a finger or the like is sent to the CPU 101 via the operation unit I/F 107.

The operation unit 108 includes, for example, a start key 402, a stop key 404, a user mode key 406, an ID key 407, a reset key 408, and the like as various operation keys. Herein, the start key of the operation unit 108 is used when a reading operation of an original image is started, for example. A two-color LED 403 of green and red is arranged in a center portion of the start key, and whether or not the start key can be used is indicated by the color. The stop key of the operation unit 108 functions so as to stop an operation in action. The ID key of the operation unit 108 is used when a user ID of a user is input. The reset key is used when settings related to the respective functions are initialized.

The card reader 119 reads information stored in the IC card on the basis of the control from the CPU 101 and notifies the CPU 101 of the read information via the external I/F 118. With the above-described configuration, the image processing apparatus 100 can send the image data read from the scanner 114 to information processing apparatus and print and output printing data received from another information processing apparatus by the printer 112. In addition, the image processing apparatus 100 send the image data read from the scanner 114 on the public line 122 by FAX using the modem 106 and output the image data received by FAX from the public line by the printer 112.

Figure 7:
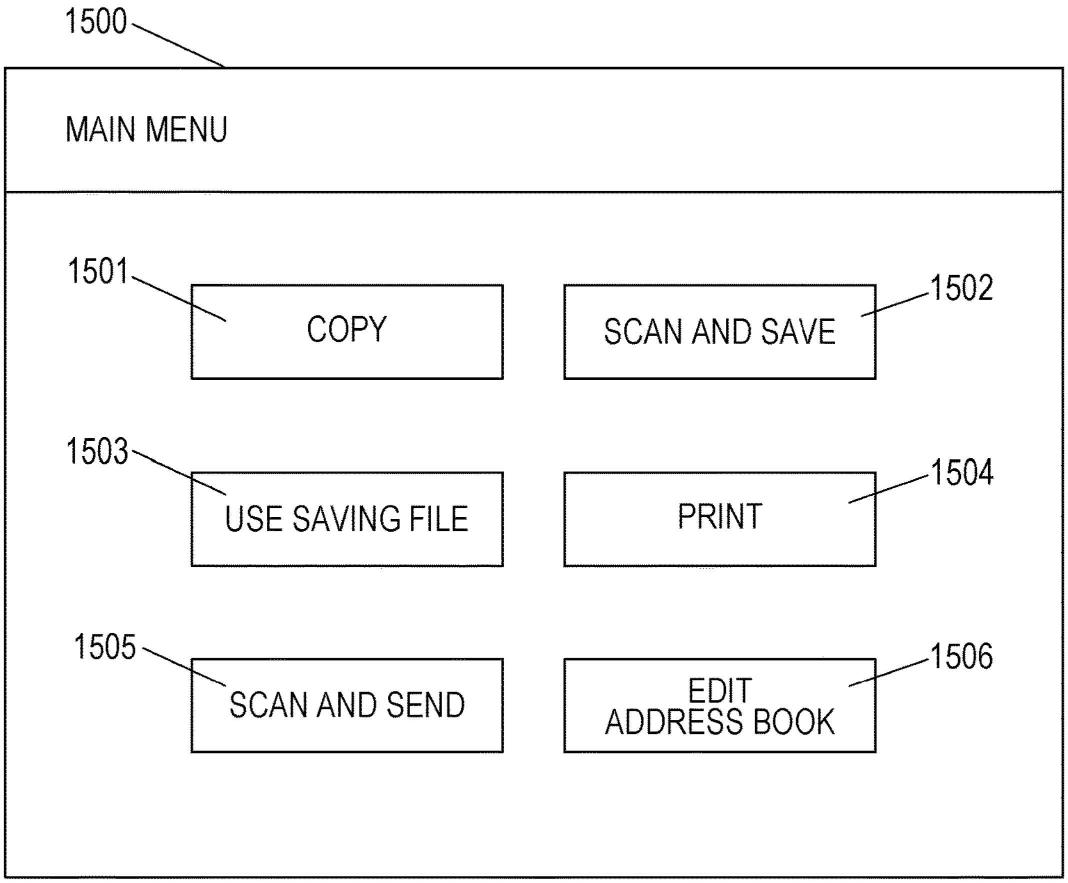
FIG. 7 illustrates a main menu displayed on an LCD display unit according to one or more aspects of the present disclosure.

FIG. 7 illustrates an example of a main menu screen 1500 displayed on the LCD display unit 401 of the image processing apparatus 100. The main menu screen 1500 is a function selection screen for selecting a function to be used by the user. Buttons 1501 to 1506 are buttons corresponding to the respective functions of the image processing apparatus 100. When the user presses the buttons 1501 to 1506 by the finger or the like, a setting screen for using a corresponding function is displayed on the LCD display unit 401. The "copy" button 1501 is a button corresponding to a copying function. The "scan and save" button 1502 and the "use saving file" button 1503 is a button corresponding to a box function. The box function refers to a function for storing the image data generated by reading the original via the scanner 114 in the RAM 102, the HDD 104, or the like or printing the stored image data via the printer 112. The "print" button 1504 is a button corresponding to a printing function. The "scan and send" button 1505 is a button corresponding to the FAX/send function. The FAX/send function is a button corresponding to a function for reading the original via the scanner 114 and sending the generated image data to another image processing apparatus or information processing apparatus via the LAN 121 or the public line 122. The "edit address book" button 1506 is a button corresponding to an address book editing function.

After the user logs in to the image processing apparatus 100, the CPU 101 displays the main menu screen 1500 on the LCD display unit 401. After the user presses the button corresponding to the function displayed on the main menu screen 1500 by the finger or the like, the CPU 101 displays the setting screen corresponding to the selected function on the LCD display unit 401. In a case where he user presses the button corresponding to one of the copying function, the box function, and the FAX/send function, the image processing apparatus 100 displays the setting screen of the job where the setting value related to the job of each function can be set on the LCD display unit 401. For example, in a case where the user presses the "copy" button 1501, the CPU 101 displays the setting screen related to the copying job. In a case where the user presses the "print" button 1504, the CPU 101 displays the setting screen related to the printing job.

Figure 9A:
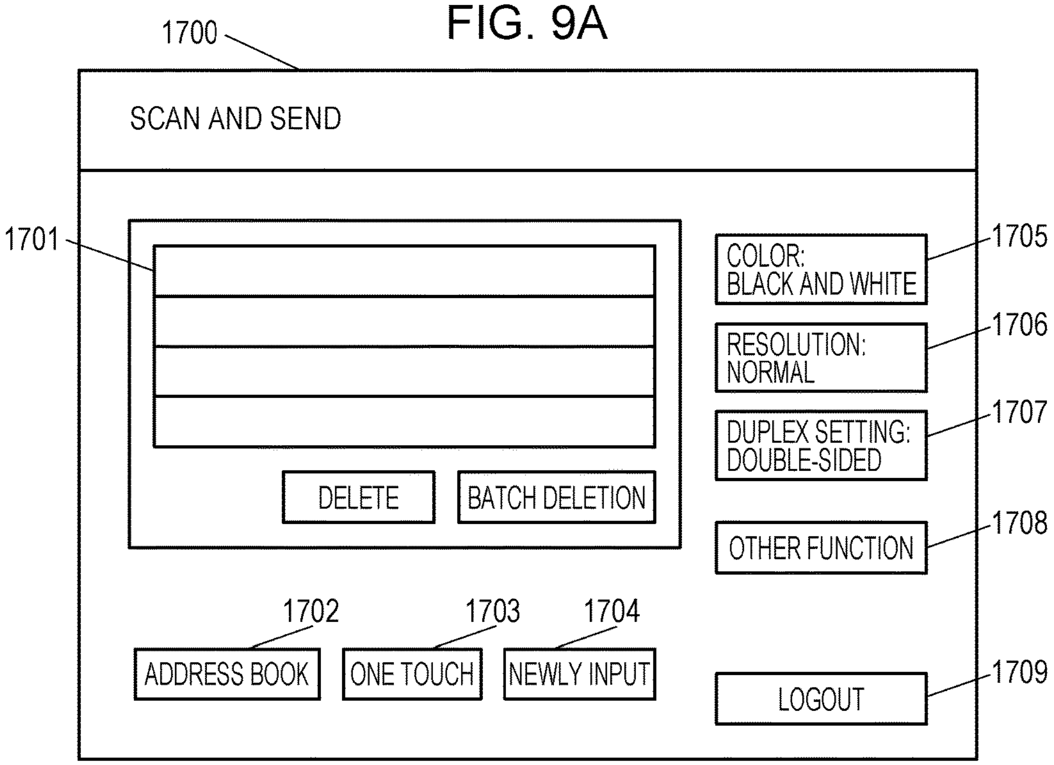
FIGS. 9A to 9D illustrate a setting screen of a FAX/send function displayed on the LCD display unit according to one or more aspects of the present disclosure.

In the following explanations, it is assumed that the user presses the "scan and send" button 1505 on the main menu screen 1500 and selects the FAX/send function. FIG. 9A illustrates a "scan and send" screen 1700 corresponding to the setting screen related to the FAX/send job. In response to the press of the "scan and send" button 1505 by the user, the CPU 101 displays the "scan and send" screen 1700 on the LCD display unit 401. The "scan and send" screen 1700 is constituted by a sending destination display unit 1701 and various buttons 1702 to 1708. Processing to be performed and settings that can be made when the various buttons 1702 to 1708 are pressed will be described below.

The user presses the various buttons 1702 to 1708 and performs the setting related to the FAX/send job including the setting of the sending destination. When the user presses a "logout" button 1709 or the ID key 407 in a state in which the "scan and send" screen 1700 is displayed, the CPU 101 stores the setting related to the job set by the user with regard to the FAX/send function in the HDD 104, and the user logs out. After the logged-out user logs in again, the CPU 101 displays the "scan and send" screen 1700 where the setting value with regard to the job stored in the HDD 104 is set on the LCD display unit 401 with respect to the setting item other than the sending destination.

Figure 2:
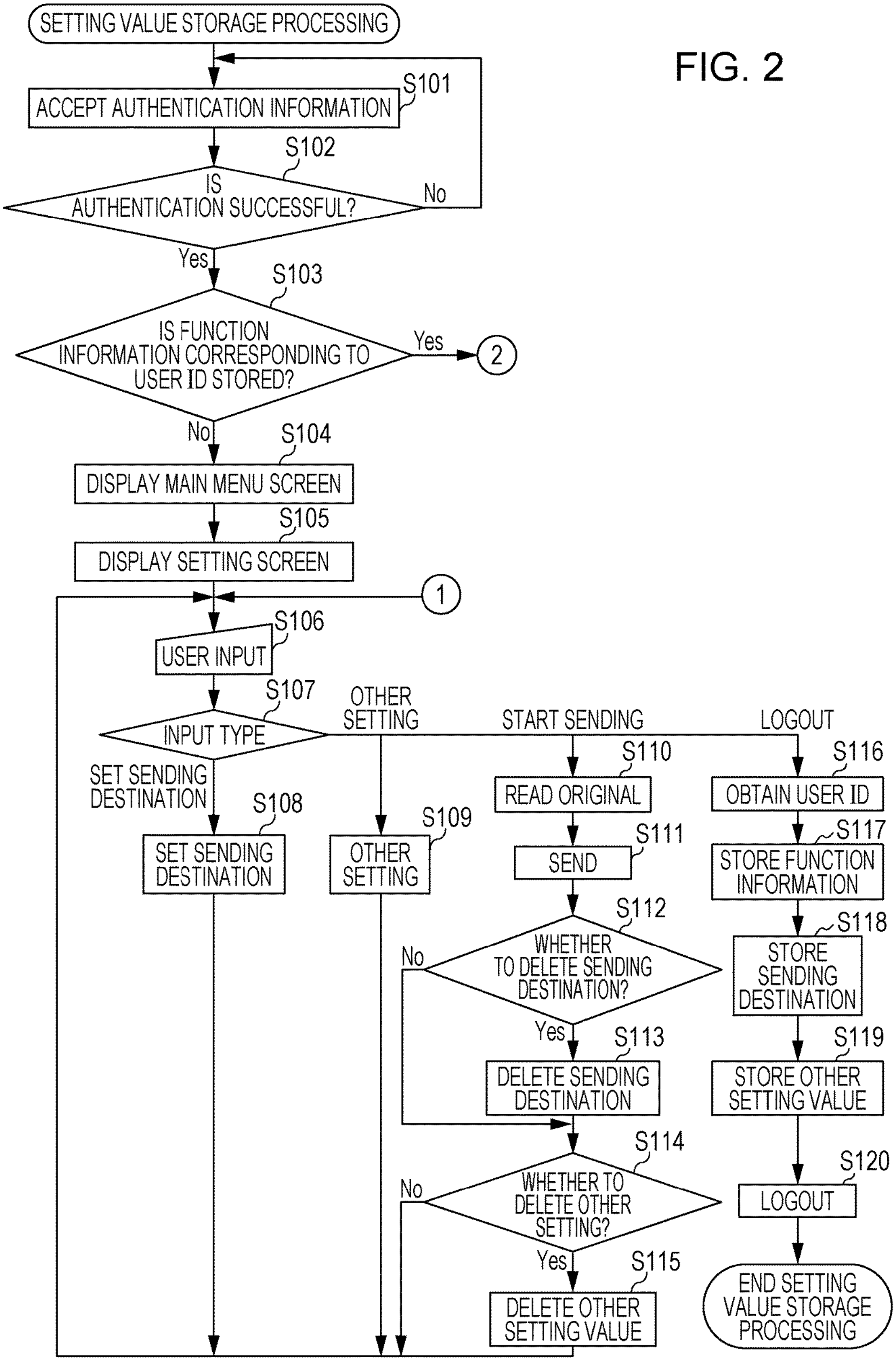
FIG. 2 is a flow chart related to processing from login until logout with respect to the image processing apparatus according to one or more aspects of the present disclosure.

FIG. 2 is a flow chart illustrating processing from the login to the logout which is performed by the CPU 101 of the image processing apparatus 100 according to one or more aspects of the present disclosure. The flow chart illustrated in FIG. 2 is stored in the HDD 104 of the image processing apparatus 100 as a program code. The CPU 101 reads the program code stored in the HDD 104 or the like and executes the following respective steps to realize the respective functions according to the exemplary embodiment of the present disclosure.

Hereinafter, the processing performed by the CPU 101 during a period in which the user logs in to the image processing apparatus 100 until the user logs out will be described with reference to FIG. 2.

First, the CPU 101 accepts authentication information of the user who uses the image processing apparatus 100 (S101). When the user brings the IC card in contact with or closer to the card reader 119, the CPU 101 starts login processing. The CPU 101 reads the user identification information stored in the IC card and performs authentication processing of the user. A method of accepting the login is not limited to a method of using the IC card. For example, the user may use a method of inputting the user ID and a password by using the operation unit 108 or the like. According to the present exemplary embodiment, the user ID is used as the user identification information.

Next, the CPU 101 determines whether or not the authentication is successful (S102). In a case where the authentication fails, the CPU 101 continues accepting the authentication of the user (S101).

Figure 6A:
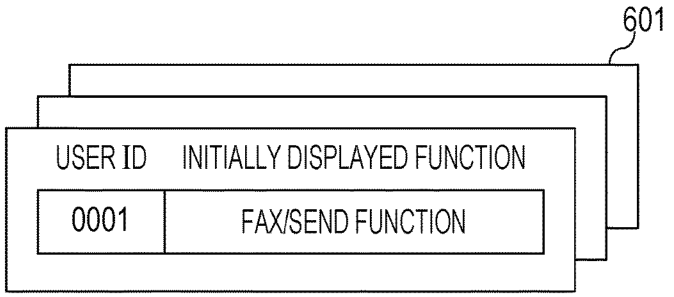
FIGS. 6A to 6C are schematic diagrams related to setting values of respective setting items stored in an HDD and an initial display function after login according to one or more aspects of the present disclosure.

In a case where the authentication is successful, the CPU 101 determines whether or not initial display function information is stored in an initial display function information table 601 corresponding to the user ID of the authenticated user (S103). The initial display function information is stored in the initial display function information table 601 of the HDD 104 when the user logs out by a method which will be described below. FIG. 6A is the schematic diagram of an initial display function information table 601 stored in the HDD 104. FIG. 6A illustrates a case where a user having a user ID "0001" logs out in a state in which the setting screen of the FAX/send function is displayed at the time of the previous logout. Processing (S101 to S103) from when the authentication of the user is accepted until the CPU 101 determines a screen displayed on the LCD display unit 401 is set as the login processing for the user to log in to the image processing apparatus 100.

In a case where the initial display function information corresponding to the user ID of the authenticated user is stored in the initial display function information table 601 of the HDD 104, the CPU 101 starts processing of FIG. 3 that will be described below. In a case where the initial display function information is not stored in the initial display function information table 601, the CPU 101 displays the main menu screen 1500 for the user to select the function on the LCD display unit 401 (S104).

The CPU 101 accepts the function selection by the user. The CPU 101 displays a function selection screen for using the respective functions on the LCD display unit 401 in accordance with the operation of the user (S105). According to the present exemplary embodiment, the user selects the "scan and send" button 1505, and the CPU 101 displays the "scan and send" screen 1700 that is the setting screen corresponding to the FAX/send function on the LCD display unit 401.

The CPU 101 displays the setting screen of the job on which a default setting value previously set by the user using an element that is not illustrated in the drawing is set on the LCD display unit 401. FIG. 9A illustrates a setting screen on which the default setting value of the FAX/send function is set. In FIG. 9A, the sending destination is not set, and a color mode "black and white", a resolution "normal", and a duplex setting "double-sided" are set.

Next, the CPU 101 accepts an input performed by the user via the operation unit 108 (S106).

Next, the CPU 101 switches the processing in accordance with the content input by the user (S107). The CPU 101 performs one of processings including setting of the sending destination, other setting, sending start processing, and logout in accordance with the content input by the user.

In a case where the user performs the input related to the sending destination, for example, a case where the user presses the "address book" button 1702, the "one touch" button 1703, and the "newly input" button 1704, the CPU 101 performs processing of setting the sending destination (sending destination setting in the drawing) (S108).

Hereinafter, the processing of setting the sending destination will be described.

Figure 12:
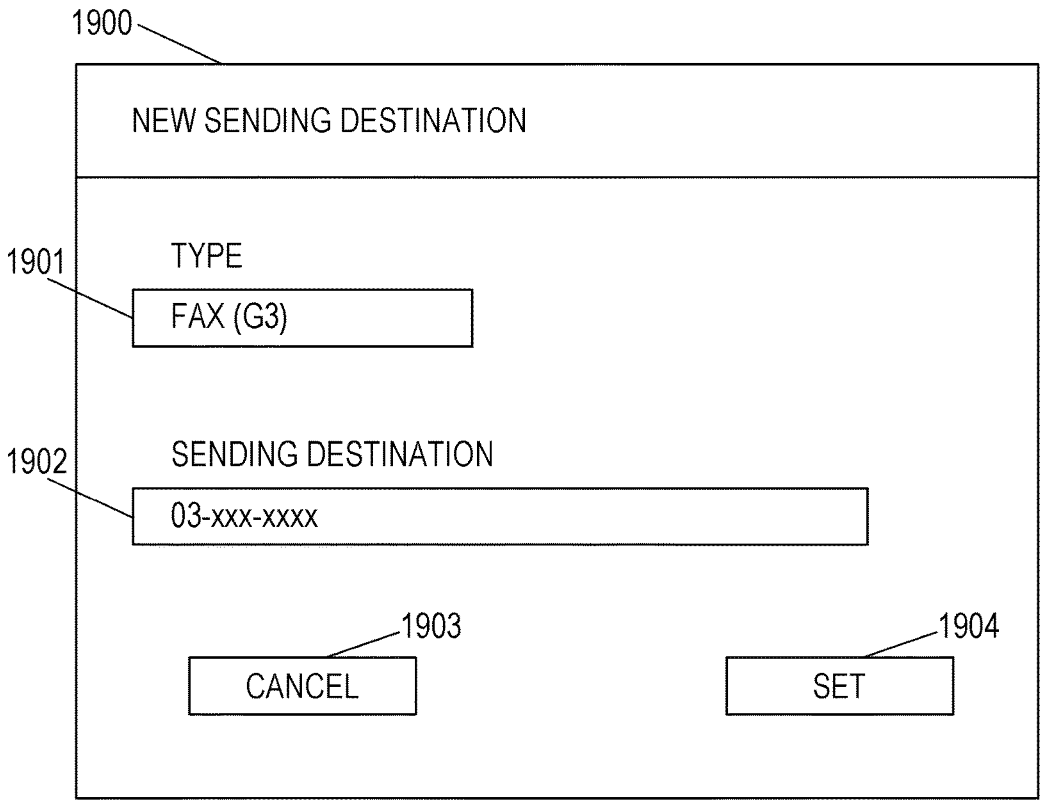
FIG. 12 illustrates a new sending destination input screen displayed on the LCD display unit according to one or more aspects of the present disclosure.

In a case where the user presses the "newly input" button 1704, the CPU 101 displays a new sending destination setting screen on the LCD display unit 401. FIG. 12 illustrates an example of the new sending destination setting screen displayed on the LCD display unit 401. A transmission class field 1901 is displayed on a new sending destination setting screen 1900, and an instruction of a transmission class by the user is accepted. The transmission class may be a function type such as "FAX", "E-mail", or "save in file" or a type based on a protocol such as "SMTP", "G3", or "SMP". Alternatively, any of combinations of those items may also be used.

A sending destination field 1902 is also displayed on the new sending destination setting screen 1900, and the CPU 101 accepts the input of the sending destination by the user. When the user presses a "set" button 1904, the CPU 101 sets contents set in the transmission class field 1901 and the sending destination field 1902 as the sending destination.

In a case where the user presses the "address book" button 1702, the CPU 101 displays an address book screen 1600 on the LCD display unit 401, and the sending destination selected by the user from among the sending destinations registered in the address book is set as the sending destination of the job.

Figure 8:
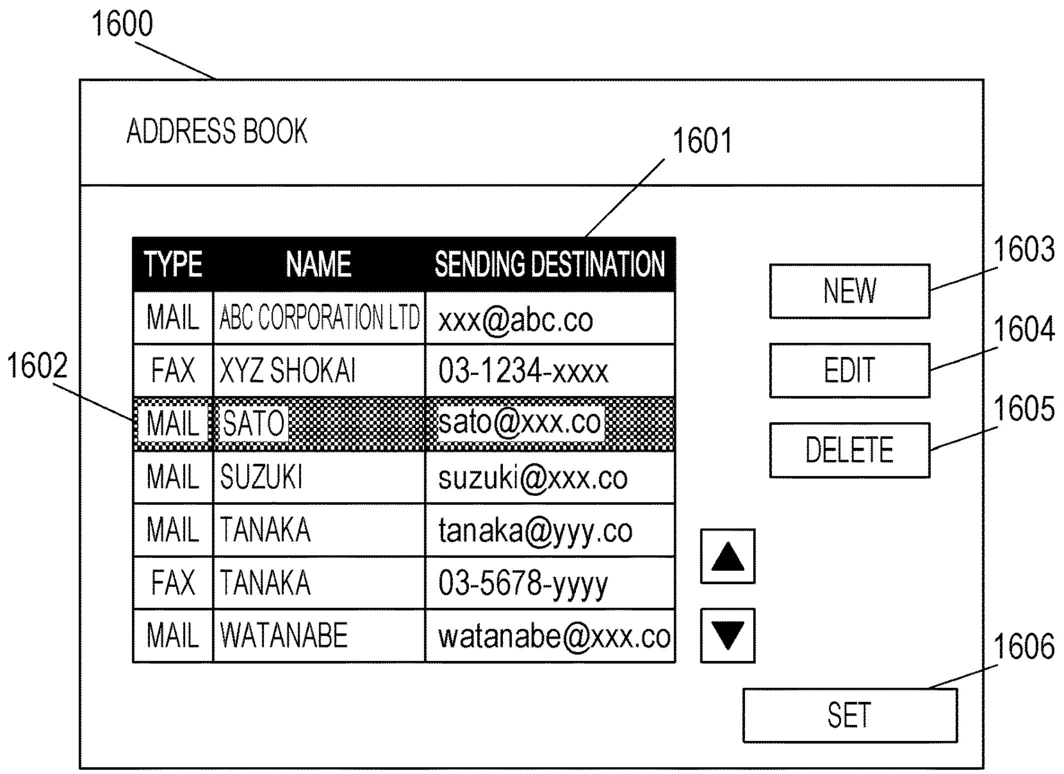
FIG. 8 illustrates an address book screen displayed on the LCD display unit according to one or more aspects of the present disclosure.

FIG. 8 illustrates an example of the address book screen displayed on the LCD display unit 401. An address list 1601, a "new address" button 1603, an "edit address" button 1604, a "delete address" button 1605, a "set" button 1606, and the like are displayed on the address book screen 1600. When the user selects an address from the address list 1601 and presses the "set" button 1606, a type and a sending destination of a selected address 1602 are set and stored in the RAM 102.

In a case where the user presses the "one touch" button 1703, the CPU 101 sets the sending destination registered in the "one touch" button 1703 as the sending destination of the job. It is assumed that the sending destination of the "one touch" button is previously set by using a method that is not illustrated in the drawing. In addition, in FIGS. 9A to 9D, the single "one touch" button 1703 is displayed on the "scan and send" screen 1700. However, the plurality of "one touch" buttons 1703 may be displayed on the "scan and send" screen 1700, and different sending destinations corresponding to the respective buttons may be registered as the sending destinations of the job.

Figure 9B:
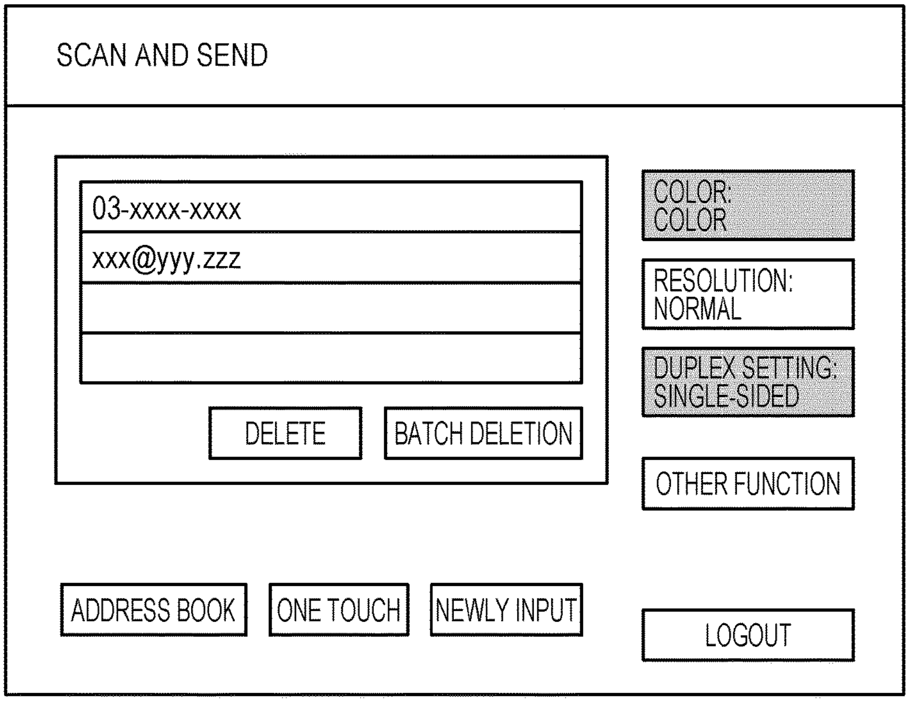

The CPU 101 displays the sending destination input by the user by the above-described operation on the sending destination display unit 1701 and stores the displayed sending destination in a sending destination table 501 of the RAM 102. FIG. 9B illustrates a setting screen on which a FAX number and an E-mail address are set as the sending destinations.

FIG. 5A is a schematic diagram of the sending destination stored in the RAM 102. It should be noted that a plurality of sending destinations can be set. For example, in the sending destination table 501 of FIG. 5A, a FAX number and an E-mail address are set as the sending destinations of the FAX/send job.

After the setting of the sending destination is ended, the CPU 101 accepts an input from the user again (S106).

Thus far, the processing of setting the sending destination has been described.

Next, a case where the CPU 101 performs processing of setting the other setting will be described.

When the user input accepted by the CPU 101 is the press of the color mode selection button 1705, the resolution setting button 1706, the duplex setting button 1707, or the other function button 1708, processing (other setting in the drawing) for setting the other setting is performed (S109).

For example, in a case where the user presses the color mode selection button 1705, the CPU 101 displays a color mode selection screen on the LCD display unit 401. Furthermore, the CPU 101 sets whether a color image or a black-and-white image is sent or the like on the basis of the input by the user at the time of the sending of the original.

In a case where the user presses the resolution setting button 1706, the CPU 101 displays a resolution setting screen on the LCD display unit 401. Furthermore, the CPU 101 sets a resolution at the time of the reading of the original on the basis of the input by the user.

In a case where the user presses the duplex setting button 1707, the CPU 101 displays a duplex selection screen on the LCD display unit 401. Furthermore, the CPU 101 performs a duplex setting on whether or not duplex reading of the original is performed on the basis of the input by the user.

The CPU 101 displays the "scan and send" screen 1700 on which the content set by the user is set on the LCD display unit 401. FIG. 9B illustrates a setting screen after the user has performed the setting with regard to the color mode and the duplex setting.

A color of a setting item where the user has changed the setting is inverted so that it is easy to discriminate the setting item where the user has changed the setting. In FIG. 9B, the colors of the color mode selection button 1705 and the duplex setting button 1707 are inverted, in which the color mode is changed from "black and white" to "color", and the duplex setting is changed from "double-sided" to "single-sided".

The CPU 101 stores the above-described set value that has been set by the user in a setting value table 502 of the RAM 102. FIG. 5B is a schematic diagram of the setting values of the other settings stored in the RAM 102. For example, in FIG. 5B, the color mode is set as "color", the resolution is set as "normal", and the duplex setting is set as "single-sided".

After the setting of the other setting, the CPU 101 accepts the input by the user again (S106). The above-described processing is the processing of performing the other setting.

Next, a case where the CPU 101 performs sending processing will be described.

When the user input accepted by the CPU 101 is the press of the start key 402, processing of sending the image data is started (start sending in the drawing).

When the user presses the start key 402, the CPU 101 starts to read the original by using the scanner 114.

The CPU 101 stores the image data generated by reading the original in the scanner 114 in the RAM 102 or the HDD 104 (S110). At this time, the CPU 101 performs control of the scanner 114 in accordance with the setting content of the setting value table 502 stored in the RAM 102. In addition, image processing is performed in the CPU 101 or the image processing unit 117 in accordance with the setting content of the setting value table 502 of the RAM 102.

Next, the CPU 101 sends the image data read by the scanner 114 to the sending destination stored in the RAM 102 (Sill). The network I/F 105 or the modem 106 is appropriately used in accordance with a type of the sending destination stored in the RAM 102, and the image data is sent to the LAN 121 or the public line 122.

Next, the CPU 101 determines whether or not the sending destination is deleted after the sending (S112). The CPU 101 refers to a sending destination deletion flag 503 stored in the RAM 102 and determines whether or not the sending destination is deleted. The sending destination deletion flag 503 is a flag prepared so as to avoid erroneous sensing because of no deletion of the sending destination when the job is subsequently sent after the job execution. The user uses an element that is not illustrated in the drawing to set "delete" or "no deletion" as the sending destination deletion flag 503. FIG. 5C is a schematic diagram of setting values related to reflection of the sending destination stored in the RAM 102 and the other setting values. For example, in FIG. 5C, after the job sending, the information of the sending destination is set as "delete" from the RAM 102, the setting value with regard to the other setting item is set as "no deletion" from the RAM 102, and the setting value stored in the RAM 102 is set as "restore" when the user logs in again.

In a case where the sending destination deletion flag 503 stored in the RAM 102 indicates "no deletion", the CPU 101 does not delete the sending destination stored in the RAM 102 and proceeds to determine whether or not the other setting value is deleted. In a case where the user logs out without deleting the sending destination after the job sending, the sending destination at the time of the previous job sending is set at the time of the logout. For this reason, the sending destination at the time of the previous job sending is stored in the HDD 104 on the basis of a method which will be described below. At this time, the setting value in which the sending destination is stored when the user logs in again is excluded from restoration targets automatically set on the job setting screen. With the above-described configuration, even in a case where the sending destination deletion flag 503 is set as "no deletion", it is possible to reduce the number of cases where the erroneous sending occurs since the sending destination that has been set at the time of the logout is set after the user logs in again.

In a case where a value indicating "delete" is set as the sending destination deletion flag 503 stored in the RAM 102, the CPU 101 deletes the sending destination stored in the sending destination table 501 and the setting content displayed on the sending destination display unit 1701 (S113).

Subsequently, the CPU 101 determines whether or not the setting value of the setting item other than the sending destination stored in the RAM 102 is deleted (S114). The CPU 101 refers to a setting value deletion flag 504 stored in the RAM 102 and determines whether or not the setting value is deleted. The user uses an element that is not illustrated in the drawing to set the setting value deletion flag 504 as a value indicating "delete" or a value indicating "no deletion". In a case where the frequency for using the FAX/send function is high in the same setting, the setting value deletion flag 504 is set as "no deletion", so that the same setting value as the previous setting value is automatically set at the time of the setting of the next job, and the work for the user to perform the job setting is reduced.

In a case where the setting value deletion flag 504 stored in the RAM 102 is the value indicating "delete", the CPU 101 deletes the setting value stored in the RAM 102 (S115). After the setting value other than the sending destination is deleted, the CPU 101 stands by for the input by the user again (S106).

In a case where the setting value deletion flag 504 stored in the RAM 102 is the value indicating "no deletion", the CPU 101 stands by for the input by the user without deleting the setting value stored in the RAM 102 (S106). The above-described processing is the sending processing.

Next, descriptions will be given of a case where the CPU 101 performs the logout processing.

When the user input accepted by the CPU 101 is the press of the "logout" button 1709 or the press of the ID key 407, the logout processing is started (logout in the drawing).

The CPU 101 obtains a user ID of the currently logged-in user (S116).

Next, the CPU 101 stores function information of the function currently displayed on the LCD display unit 401 and the obtained user ID in the HDD 104 while being associated with each other (S117). FIG. 6A is a schematic diagram of the function information stored in the HDD 104. For example, in FIG. 6A, it is stored that the setting screen related to the job of the FAX/send function is displayed on the LCD display unit 401 at the time of the logout.

Figure 6B:
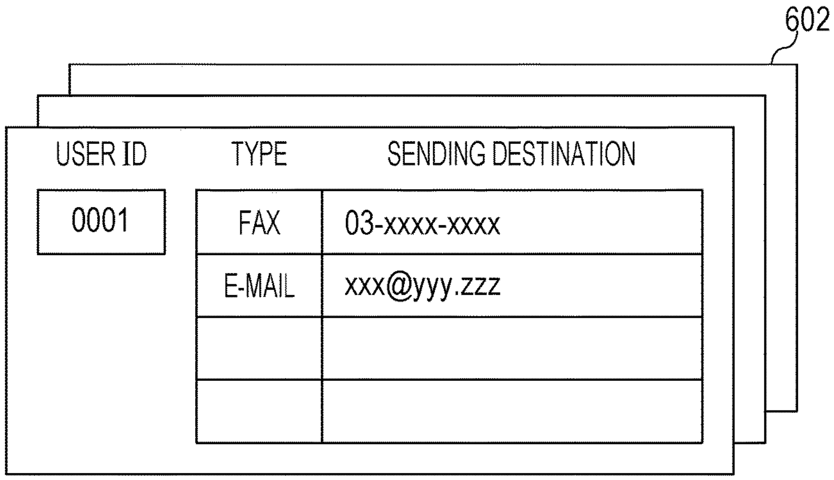

Next, the CPU 101 stores the sending destination stored in the sending destination table 501 of the RAM 102 in the HDD 104 while being associated with the obtained user ID (S118). FIG. 6B is a schematic diagram of the information of the sending destination stored in the HDD 104. For example, in FIG. 6B, a FAX number and an E-mail address are stored in a sending destination table 602 of the HDD 104 as the sending destination with regard to the user having the user ID "0001".

Figure 6C:
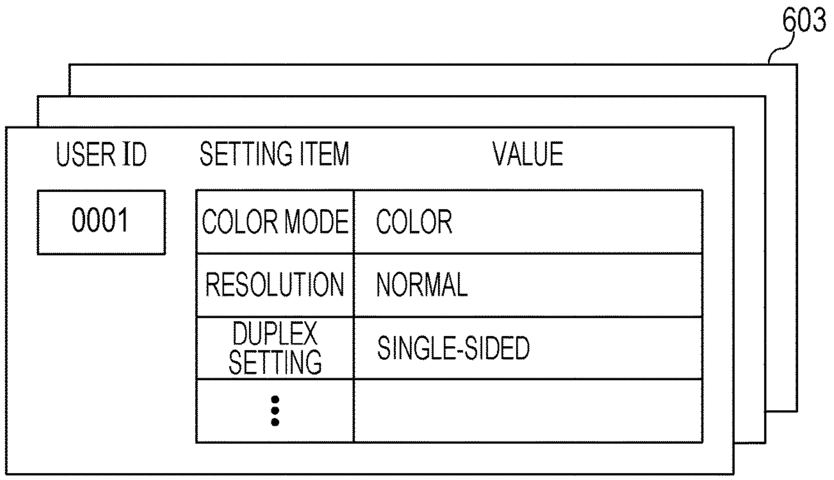

Next, the CPU 101 saves the setting content stored in the setting value table 502 of the RAM 102 in the HDD 104 while being associated with the obtained user ID (S119). FIG. 6C is a schematic diagram of information of the setting content stored in the HDD 104. For example, in FIG. 6C, the color mode with regard to the user having the user ID "0001" is "color", the resolution is "normal", and the duplex setting is "single-sided", which are stored in a setting value table 603 of the HDD 104.

Next, the CPU 101 performs the logout processing with respect to the logged-in user and ends the processing in the present flow chart (S120).

With the above-described processing, the sending destination that is set when the user logs out and the setting values of the respective setting items are stored in the HDD 104.

Next, the restoration processing of the stored sending destination and the setting value will be described with reference to FIG. 3.

In the following explanations, a case will be described where the user uses the FAX/send function at the time of the logout, and the "scan and send" screen 1700 where the setting value stored at the time of the logout with regard to the setting item other than the sending destination is automatically set is displayed after the user logs in again. In FIG. 3, the setting screen where the setting value of the other setting item except for the sending destination stored in the HDD 104 is set is displayed. As a result, it is possible to avoid the automatic display of the setting screen where the sending destination stored at the time of the logout is set, and the probability of the erroneous sending can be suppressed.

In S103 of FIG. 2, in a case where an initial display function corresponding to the user ID of the authenticated user is stored in the initial display function information table 601 of the HDD 104, the CPU 101 displays the setting screen of the function corresponding to the initial display function information on the LCD display unit 401 (S201).

Next, the CPU 101 determines whether or not the setting screen where the setting value stored in the HDD 104 at the time of the logout is set is displayed (S202). The user previously sets whether or not a setting value restoration function is used by using a method that is not illustrated in the drawing. For example, the LCD display unit 401 can display the screen for setting whether or not the setting value restoration function is used, and the user can set whether or not the setting value restoration function is used by using the screen. The CPU 101 determines whether or not restoration processing of the setting value stored at the time of the logout is performed in accordance with the setting carried out by the user.

In a case where the CPU 101 determines that the setting screen where the setting value stored at the time of the logout is set is not displayed, the CPU 101 proceeds to S106 of FIG. 2 and accepts the input by the user.

When it is determined that the setting screen where the setting value stored at the time of the logout is set is displayed, the CPU 101 obtains the setting value stored in the setting value table 603 of the HDD 104 with regard to the setting item other than the sending destination (S203).

The CPU 101 stores the setting value obtained from the setting value table 603 of the HDD 104 in the setting value table 502 of the RAM 102 (S204).

After the CPU 101 stores the setting value obtained from the HDD 104 in the RAM 102, the CPU 101 displays the setting screen where the setting value stored at the time of the logout is set on the LCD display unit 401 (S205).

The CPU 101 displays the setting screen on the LCD display unit 401 and thereafter proceeds to S106 of FIG. 2 to accept the input from the user.

Figure 9C:
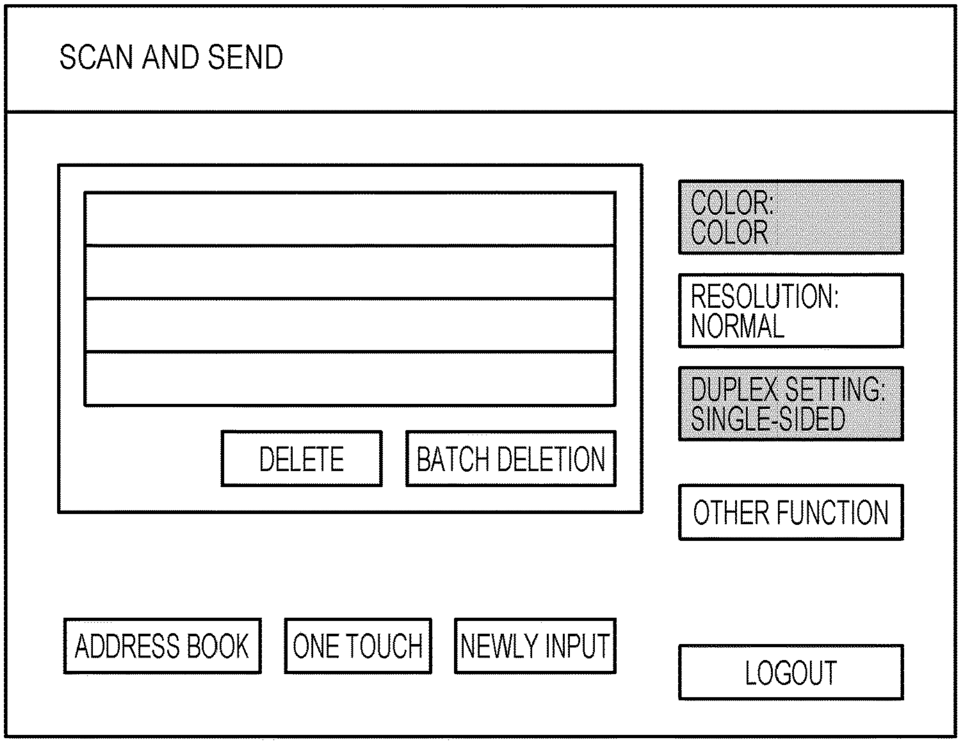

FIG. 9C illustrates the setting screen of the FAX/send job where the setting value stored in the HDD 104 is set with regard to the setting item other than the sending destination which is displayed on the LCD display unit 401 after the user logs in again. In FIG. 9C, the sending destination that has been set at the time of the logout is not set, and the same settings as those at the time of the logout are made with regard to the color mode, the resolution, and the duplex setting.

Figure 3:
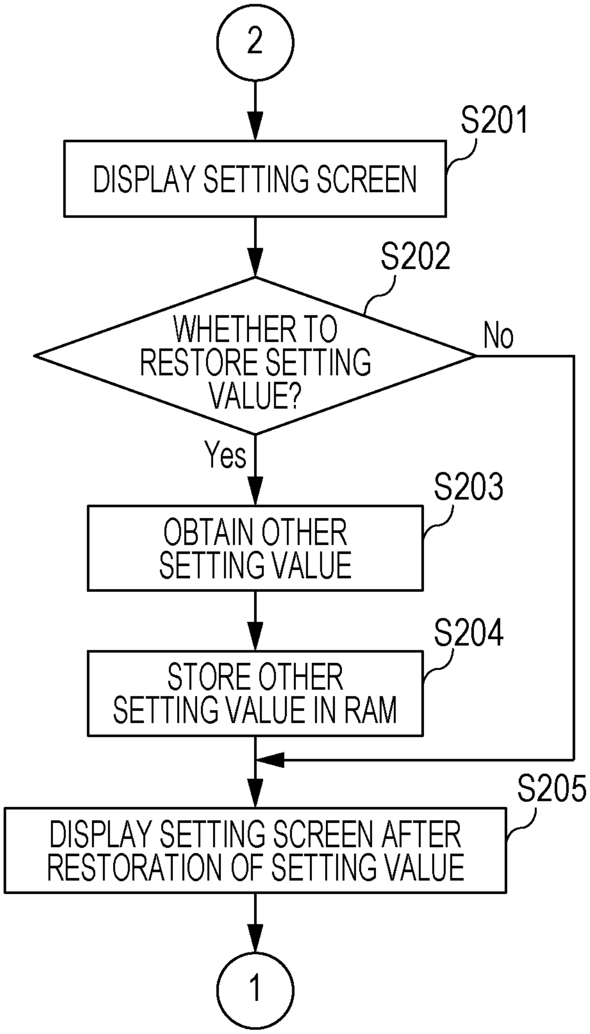
FIG. 3 is a flow chart related to restoration processing of a setting value of the image processing apparatus according to one or more aspects of the present disclosure.

The case has been described where, in S201 of FIG. 3, the CPU 101 displays the setting screen before the setting value stored at the time of the logout is set on the LCD display unit 401. However, the CPU 101 may display the setting screen illustrated in FIG. 9C on the LCD display unit 401 in S205 without displaying the setting screen in S201.

When the above-described processing is executed, the setting screen where the setting value at the time of the logout is automatically set with regard to the setting item other than the sending destination when the user logs in again can be displayed on the LCD display unit 401. Since the setting screen where the setting value at the time of the logout is automatically set with regard to the setting item other than the sending destination is displayed on the LCD display unit 401, the work related to the setting in a case where the similar setting value to the previous setting value is used is reduced. On the other hand, since the sending destination is excluded from the restoration target, the sending destination needs to be input again when the user logs in again. Accordingly, it is possible to decrease the probability that the user erroneously sends the FAX data or the E-mail to the same sending destination as the sending destination at the time of the logout.

According to the first exemplary embodiment, log-in means the status that the authenticated user can operate the image processing apparatus.

It should be noted that, according to the first exemplary embodiment, in S118 of FIG. 2, the CPU 101 stores the sending destination stored in the sending destination table 501 of the RAM 102 in the HDD 104. However, in S118, the CPU 101 does not necessarily need to store the sending destination in the HDD 104.

In addition, the case has been described where the user previously determines whether or not the setting value restoration function is used with regard to the setting value of the setting item other than the sending destination by using a method that is not illustrated in the drawing in S202 according to the first exemplary embodiment. However, a configuration may also be adopted in which the setting value stored at the time of the logout is regularly set with regard to the setting item other than the sending destination while the user does not select whether or not the setting value restoration function is used.

Furthermore, according to the first exemplary embodiment, the case has been described where it is determined whether or not the setting value restoration function is used with regard to the setting item other than the sending destination in accordance with a setting value restoration flag 505 of the RAM 102. However, it may be determined whether or not the setting value restoration function is used by referring to the setting value deletion flag 504 of the RAM 102. For example, in a case where the setting value deletion flag 504 indicates "no deletion", since the user is in an environment where the frequency of executing the job at the same setting is high, the setting value restoration function is used when the user logs in again. In a case where the setting value deletion flag 504 indicates "delete", the setting value restoration function is not used.

Second Exemplary Embodiment

According to the first exemplary embodiment, the descriptions have been given of the method of displaying the setting screen where the setting value at the time of the logout with regard to part of the setting items is automatically set, and the setting value at the time of the logout is not set with regard to the other setting item. According to a second exemplary embodiment, a case will be described where the setting value at the time of the logout is automatically set with regard to part of the setting items, and the setting screen is displayed where the setting value is set with regard to the other setting item after a restoration instruction of the user is received.

According to the second exemplary embodiment, a case will be described as an example where the user uses the FAX/send function and displays the setting screen where the setting value at the time of the logout with regard to the setting value other than the sending destination is automatically set similarly as in the first exemplary embodiment. With the above-described configuration, the setting screen where the setting value at the time of the logout with regard to the setting item other than the sending destination is automatically set is displayed, and the work for the user to perform the setting of the setting value again is reduced. On the other hand, the setting value at the time of the logout with regard to the sending destination is excluded from the target of the automatic setting when the user logs in again, and an inquiry is made to the user on whether or not the setting value at the time of the logout is set after the user logs in again. Since the sending destination is set in accordance with the user instruction after the user logs in again, in a case where the same sending destination as the sending destination at the time of the logout is used, it is possible to omit the work for setting the sending destination from the beginning.

The processing performed by the CPU 101 from the login until the automatic setting of the setting value of the setting item other than the sending destination is similar to the processing of the first exemplary embodiment, and descriptions thereof will be omitted.

The processing performed by the CPU 101 when the sending destination at the time of the logout is set on the basis of the restoration instruction of the user will be described with reference to FIG. 4. The CPU 101 performs the processing in S201 to S204, so that the setting value at the time of the logout is automatically set with regard to the setting item other than the sending destination. The sending destination is not the target of the processing in S201 to S204 and is excluded from the restoration target of automatically setting the setting value at the time of the logout.

After the CPU 101 stores the setting value stored in the setting value table 603 of the HDD 104 in the setting value table 502 of the RAM 102, the CPU 101 determines whether or not the sending destination at the time of the logout is set (S401). Specifically, the CPU 101 refers to the sending destination deletion flag 503 stored in the RAM 102 and determines that the sending destination is set when the content of the sending destination deletion flag is "no deletion". When the content of the sending destination deletion flag 503 of the RAM 102 is "delete", the CPU 101 determines that the sending destination is not set and proceeds to S106 of FIG. 2 to accept the input by the user.

In a case where the CPU 101 determines that the sending destination is set, the CPU 101 refers to the sending destination table 602 of the sending destination associated with the user ID and stored in the HDD 104 and obtains the sending destination that has been set at the time of the previous logout (S402).

Figure 10:
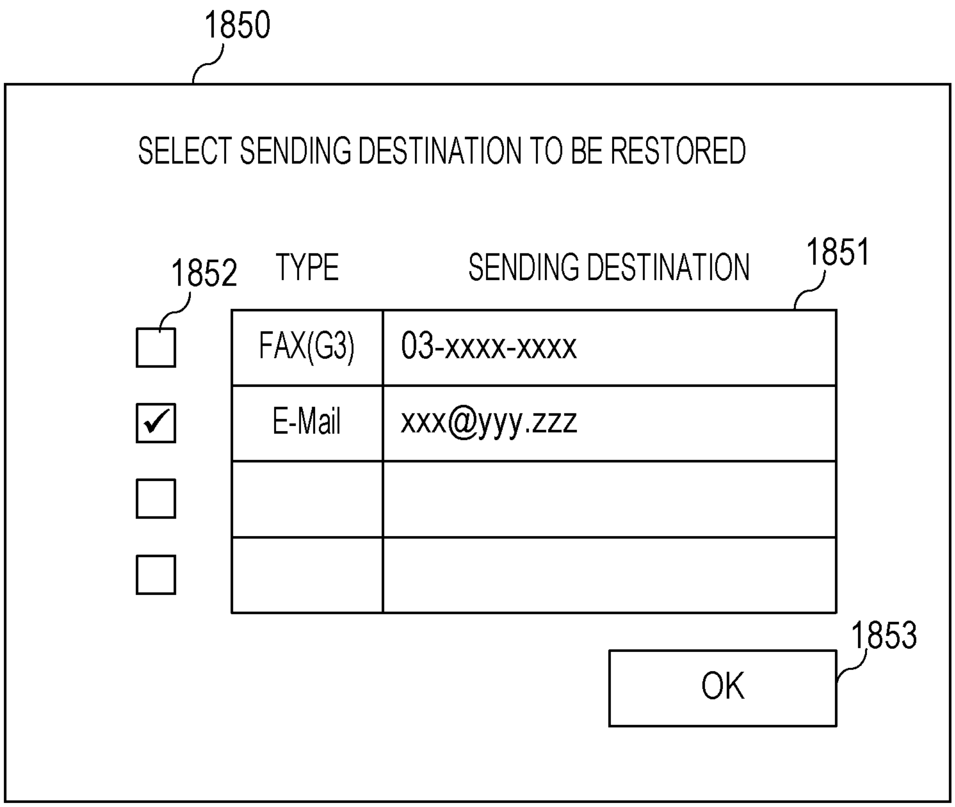
FIG. 10 illustrates a restoration confirmation screen and a sending destination restoration confirmation screen displayed on the LCD display unit according to one or more aspects of the present disclosure.

Next, the CPU 101 determines the sending destination obtained from the HDD 104 as a candidate of the sending destination to be set and displays the sending destination in a sending destination restoration setting dialog on the LCD display unit 401 (S403). FIG. 10 illustrates an example of the sending destination restoration setting dialog. A sending destination list 1851, a restoration setting check box 1852, and an OK button 1853 are arranged in the sending destination restoration setting dialog. The sending destination obtained by the CPU 101 from the HDD 104 is displayed in the sending destination list 1851.

Next, the CPU 101 accepts an input of the sending destination to be set from the user (S404). Specifically, the CPU 101 accepts a press of each button of the restoration setting check box 1852 and the OK button 1853. Each button of the restoration setting check box 1852 is a toggle, and the presence or absence of a check is switched for each press. When the press of the OK button 1853 is accepted, the CPU 101 accepts the sending destination with the check in the restoration setting check box 1852 as the sending destination to be set on the job setting screen.

Next, the sending destination where the setting is accepted by the CPU 101 is stored in the sending destination table 501 of the RAM 102 (S405). Specifically, the sending destination with the check in the restoration setting check box 1852 of FIG. 10 is stored in the sending destination table 501 of the RAM 102. When the CPU 101 performs the processing in S401 to S405, the setting value at the time of the logout is set in accordance with the restoration instruction of the user without automatically setting the setting value at the time of the logout with regard to the sending destination.

Figure 9D:
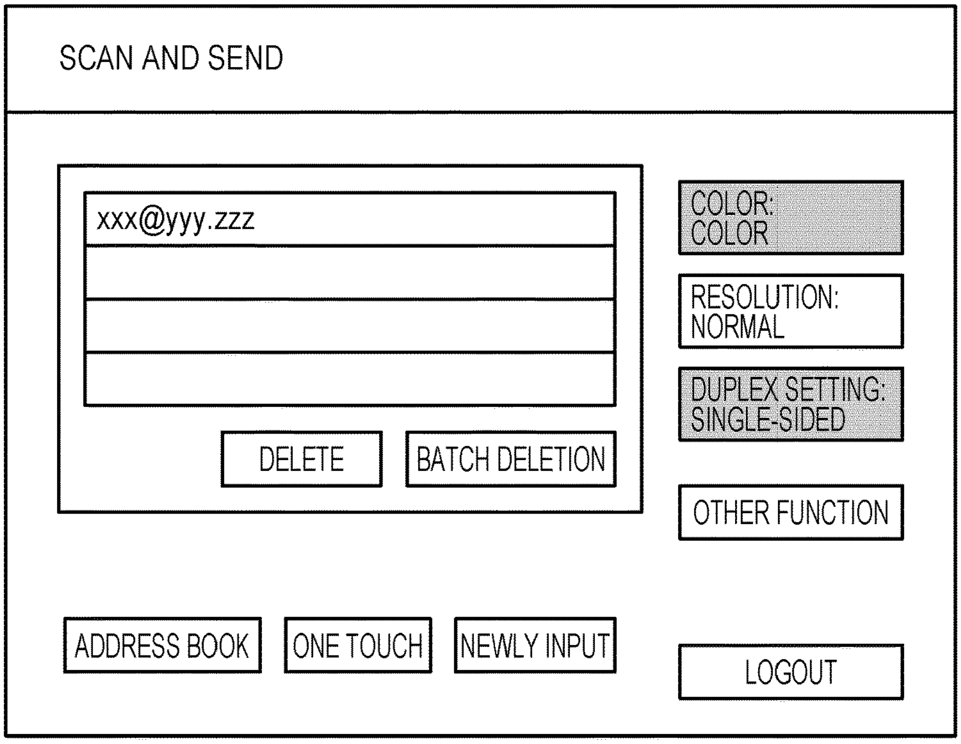

After the restoration processing with regard to the sending destination and the other setting value is ended, the CPU 101 displays the setting screen in a state in which the setting value at the time of the logout is set on the LCD display unit 401 (S205). FIG. 9D illustrates the setting screen displayed on the LCD display unit 401 after the restoration processing with regard to the sending destination and the other setting value is ended. In FIG. 9D, the color mode is set as "color", and the duplex setting is set as "single-sided", and also a sending destination "xxx@yyy.zzz" selected in FIG. 10 is set. The CPU 101 displays the setting screen and then proceeds to S106 of FIG. 2.

Figure 4:
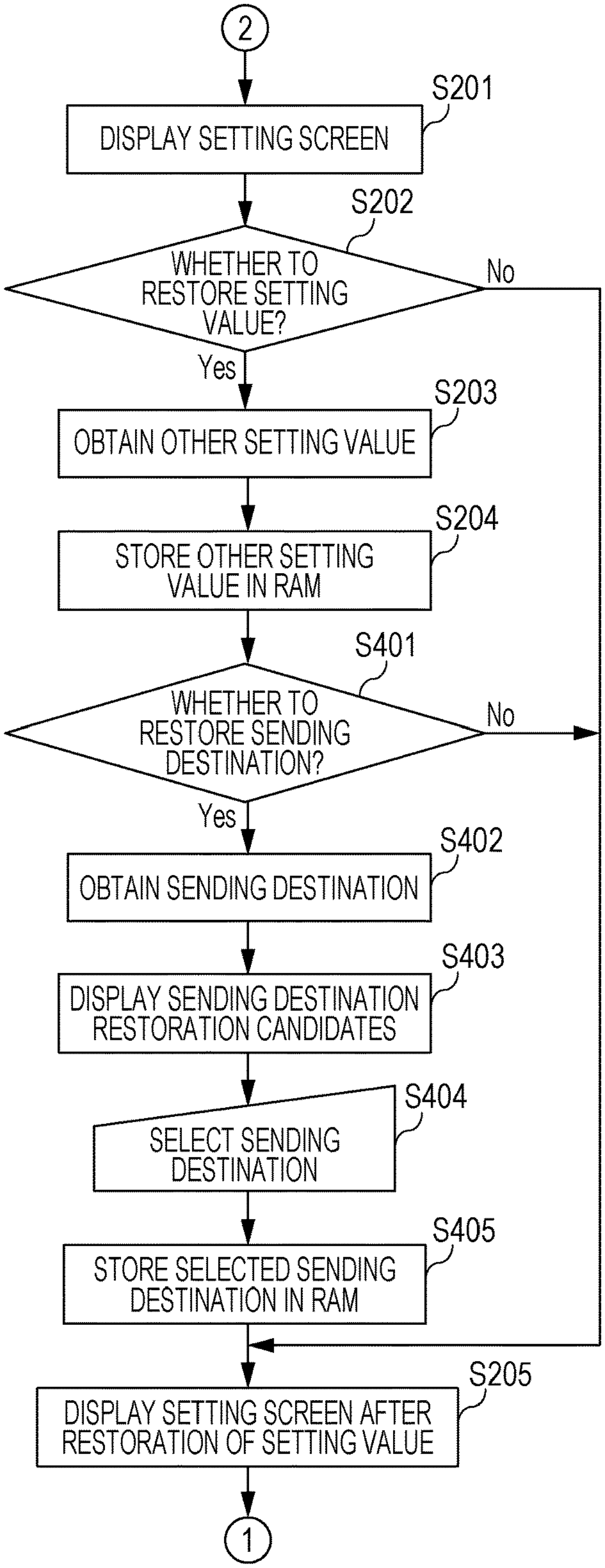
FIG. 4 is a flow chart related to the restoration processing of the image processing apparatus according to one or more aspects of the present disclosure.

In the explanations on the restoration processing of the sending destination and the setting value with reference to FIG. 4, the case has been described where the CPU 101 stores the setting value stored in the HDD 104 in the RAM 102 in S204. However, in S204, the CPU 101 may store the setting value stored in the HDD 104 in the RAM 102 and display the setting screen where the stored setting value is set on the LCD display unit 401. For example, in S204, the CPU 101 may display the setting screen where the setting value is set with regard to the setting item other than the sending destination on the LCD display unit 401. Thereafter, the CPU 101 may perform the processing in S401 to S405 and S205 and display the setting screen on which the sending destination where the user performs the restoration instruction is displayed on the LCD display unit 401.

While the above-described processing is performed, the setting screen where the setting value that has been set at the time of the logout with regard to the setting item other than the sending destination is automatically displayed can be displayed on the LCD display unit 401 when the user logs in. Furthermore, the setting screen where the sending destination is set with regard to the sending destination where the user instructs the setting is set is displayed. As a result, the work for the user to set the sending destination is reduced.

Although the descriptions have been given that the sending destination deletion flag 503 stored in the RAM 102 is referred to, and it is determined whether or not the sending destination is set in S401, the CPU 101 can also make the determination by using another method. For example, a configuration may be adopted in which the CPU 101 refers to the sending destination table 602 of the HDD 104, and then, the CPU 101 does not perform the setting of the sending destination at the time of the logout in a case where the sending destination table 602 includes the sending destination of the FAX, but the CPU 101 performs the setting of the sending destination at the time of the logout in a case where the sending destination table 602 does not include the sending destination of the FAX. With the above-described configuration, it is possible to determine whether or not the setting of the sending destination at the time of the logout is performed on the basis of the transmission class or the protocol. The use frequency of the FAX that confirms whether or not the FAX apparatus at the sending destination is communicable and then sends the original so that the original can be reliably sent to the sending destination may be high for sending an important original as compared with a communication using the other transmission class or protocol such as the E-mail. In the above-described case, while a configuration is adopted in which the setting of the sending destination set at the time of the logout is not used in a case where the sending destination table 602 includes the sending destination of the FAX, the probability of the erroneous sending when an original having high importance is sent is decreased.

Furthermore, the sending destination of the FAX in the sending destination table 602 of the sending destinations stored in the HDD 104 may be excluded from the restoration targets.

In addition, in S401 of FIG. 4, selection of the method from one of "restore" and "no restoration" with regard to the sending destination and "inquire" about the sending destination to be set on the job setting screen may be previously set by the user using a method that is not illustrated in the drawing. In this case, in S401, the CPU 101 determines whether or not the restoration processing of the sending destination is performed in accordance with the selection of the user.

Third Exemplary Embodiment

According to the above-described first or second exemplary embodiment, the example has been described in which the setting screen where the setting value at the time of the logout is set with regard to the setting item other than the sending destination is displayed when the user logs in again without depending on the restoration instruction by the user. In contrast to this, according to a third exemplary embodiment, descriptions will be given of a method in which the setting item where the setting value at the time of the logout is set without depending on the restoration instruction of the user can be previously set by the user.

As a result, it is possible to display the setting screen where the setting value at the time of the logout is automatically set with regard to the setting item desired by the user. With the above-described configuration, the work for the setting after the user logs in again with regard to the setting item previously set by the user is reduced. On the other hand, the setting item other than the setting item previously set by the user is excluded from the target of the automatic setting of the setting value. As a result, the probability that the job is executed at the setting value that is not intended by the user with regard to the setting item where the setting value at the time of the logout is not automatically set is decreased.

Figure 13:
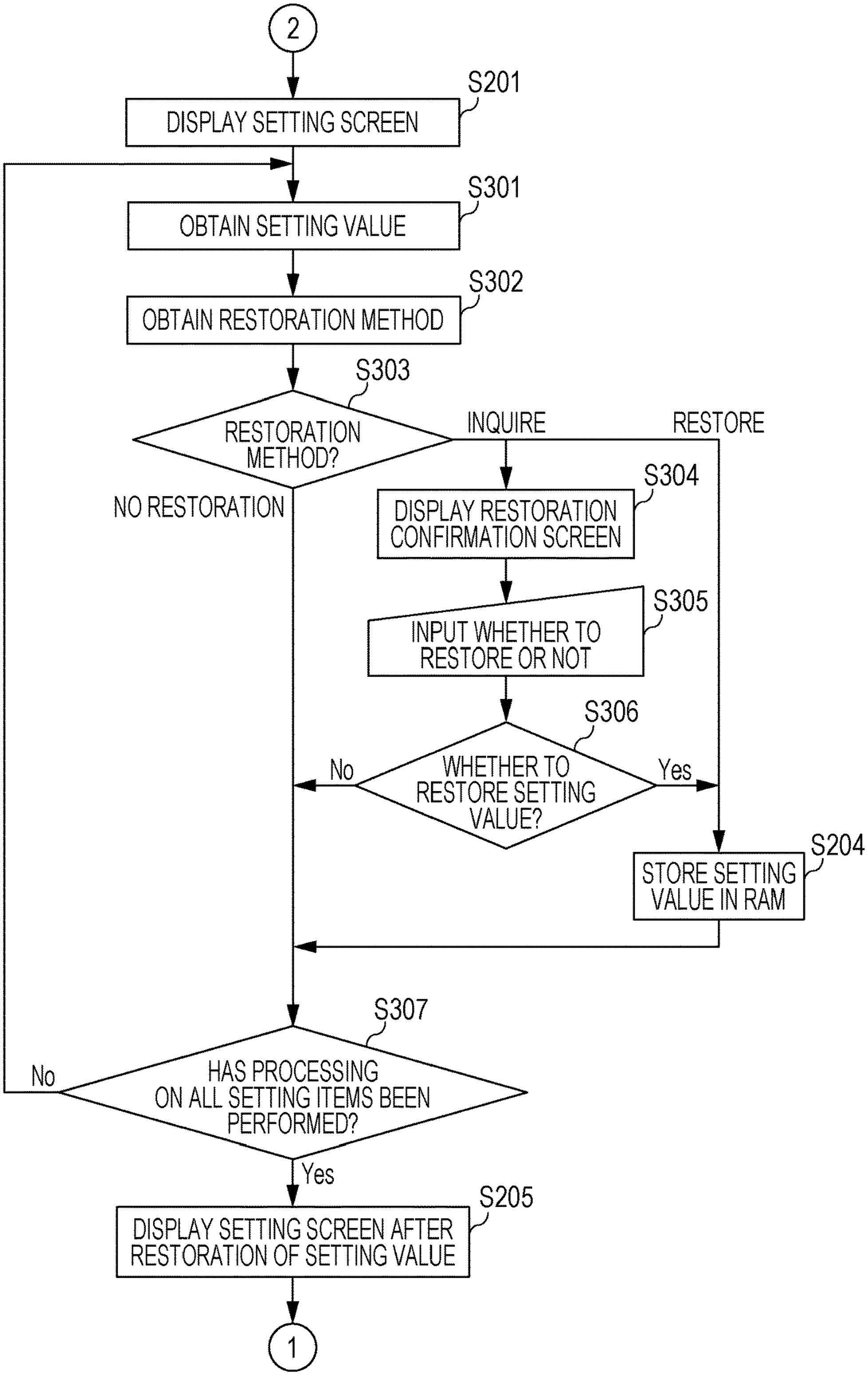
FIG. 13 is a flow chart related to setting value restoration processing of the image processing apparatus according to one or more aspects of the present disclosure.

Hereinafter, the processing performed by the CPU 101 according to the third exemplary embodiment will be described with reference to FIG. 13. A flow chart illustrated in FIG. 13 is stored in the HDD 104 of the image processing apparatus 100 as a program code. The CPU 101 reads the program code stored in the HDD 104 and executes the following respective steps to realize the respective functions according to one or more aspects of the present disclosure.

It should be noted that, according to the third exemplary embodiment too, the processing until the CPU 101 stores the setting values of the respective setting items in the HDD 104 at the time of the logout is similar to the first exemplary embodiment, and the descriptions of S101 to S120 and S201 will be omitted.

The CPU 101 obtains values stored in the setting value table 603 of the HDD 104 with regard to the setting values of the respective setting items (S301). At this time, in a case where the CPU 101 obtains the sending destination, the sending destination table 602 of the sending destination stored in the HDD 104 is obtained.

Figure 14A:
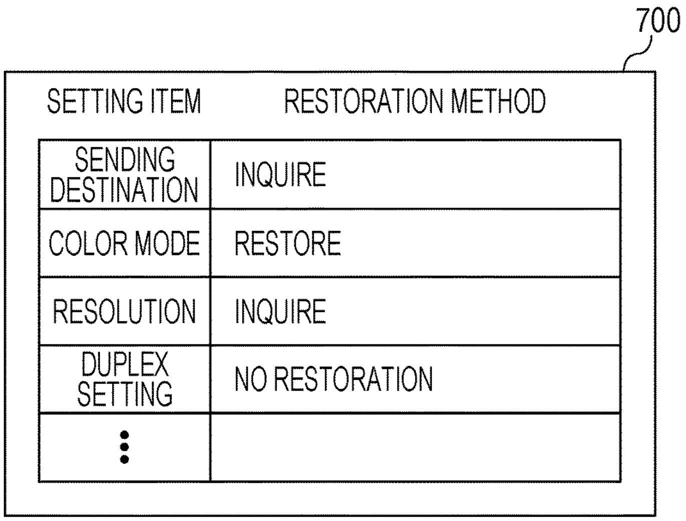
FIGS. 14A and 14B are a schematic diagram illustrating a restoration method for each setting item stored in a RAM and a diagram illustrating the restoration confirmation screen displayed on the LCD display unit according to one or more aspects of the present disclosure.

Next, the CPU 101 obtains a restoration method of the setting item from the RAM 102 with regard to the setting item in which the setting value is obtained from the HDD 104 (S302). The CPU 101 refers to the setting value stored in a restoration method table 700 of the RAM 102 and determines the restoration method. FIG. 14A is a schematic diagram of a restoration method information stored in the RAM 102. The restoration method information is set as one of the values including "restore", "no restoration", and "inquire" for each setting item by the user using a method that is not illustrated in the drawing. The setting item set as "no restoration" or "inquire" by the user is excluded from the target for automatically setting the setting value at the time of the logout after the user logs in again. For example, in FIG. 14A, "inquire" is stored with regard to the sending destination and the resolution, "restore" is stored with regard to the color mode, and "no restoration" is stored with regard to the duplex setting.

The CPU 101 determines which one of "restore", "no restoration", and "inquire" the restoration method for the setting item in which the setting value is obtained is (S303).

When the restoration method for the setting item in which the setting value is obtained is "restore", the CPU 101 stores the setting value in the setting value table 502 of the RAM 102 (S204). The CPU 101 performs the processing in S301 to S303 and S204 with regard to the setting item in which the user previously sets that the setting of the setting value is automatically performed after the user logs in again. As a result, the setting value that has been set at the time of the logout is automatically set after the user logs in again with regard to the setting item in which the user previously sets that the setting of the setting value is automatically performed. The CPU 101 stores the setting value in the setting value table 502 of the RAM 102 and thereafter determines whether or not the processing with regard to the setting items is ended (S307).

When the restoration method for the setting item in which the setting value is obtained is "no restoration", the CPU 101 does not store the setting value in the setting value table 502 of the RAM 102 and determines whether or not the setting is made with regard to the setting items (S307).

Figure 14B:
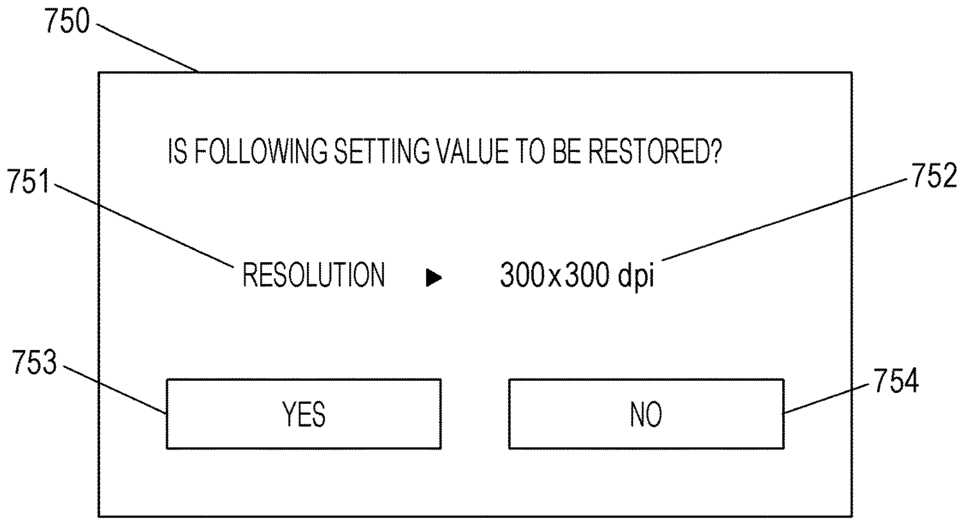

When the restoration method for the setting item in which the setting value is obtained is "inquire", the CPU 101 displays a restoration confirmation screen 750 for inquiring the user with regard to the setting of the setting value of the setting item on the LCD display unit 401 (S304). FIG. 14B illustrates an example of the restoration confirmation screen displayed on the LCD display unit 401 by the CPU 101.

A name 751 of the setting item in which the CPU 101 obtains the setting value and the setting value 752 obtained by the CPU 101 are displayed on the restoration confirmation screen 750. Furthermore, a "yes" button 753 and a "no" button 754 are arranged on the restoration confirmation screen 750. It should be noted that, in a case where the setting item in which the CPU 101 obtains the setting value is the sending destination, the screen similar to that in FIG. 10 is displayed, and the user is inquired on whether or not the setting is made for each sending destination.

The CPU 101 accepts the user input on whether or not the displayed setting value is set. Specifically, the CPU 101 accepts the press of the "yes" button 753 or the "no" button 754 arranged on the restoration confirmation screen 750. Alternatively, the CPU 101 accepts the press of the restoration setting check box 1852 and the OK button 1853 arranged on the sending destination restoration setting dialog 1850 (S305).

The CPU 101 determines the input by the user which is accepted by the restoration confirmation screen 750 (S306). When the user input accepted by the CPU 101 is the press of the "yes" button 753, the setting value is stored in the setting value table 502 of the RAM 102 (S204). After the storage of the setting value is ended, the CPU 101 determines whether or not the restoration processing is completed with regard to the setting items (S307).

When the accepted input by the user is the press of the "no" button 754, the CPU 101 determines whether or not the processing is completed with regard to the setting items (3307). Since the user is inquired on whether or not the setting of the setting value at the time of the logout is performed, the work for preforming the setting again for using the same setting value as the setting value at the time of the logout after the user logs in again is reduced with regard to the setting item that is not set as the restoration target for automatically setting the setting value at the time of the logout after the user logs in again.

In a case where the CPU 101 determines that the processing is not completed with regard to the setting items, the setting value and the restoration method are obtained with regard to the remaining setting item, and the processing in accordance with the restoration method is performed (S301 to S306, S204). In a case where the CPU 101 determines that the processing is completed with regard to the setting items, the setting screen where the setting value at the time of the logout is set is displayed on the LCD display unit 401 to end the restoration processing of the setting value (S205).

After the setting screen where the setting value at the time of the logout is set is displayed, the CPU 101 proceeds to the processing in S106 of FIG. 2 and stands by for the input by the user.

In the explanations of the restoration processing of the sending destination and the setting value with reference to FIG. 13, the case has been described where the CPU 101 stores the setting value stored in the setting value table 603 of the HDD 104 in the setting value table 502 of the RAM 102 in S204. However, in S204, the CPU 101 may store the setting value stored in the setting value table 603 of the HDD 104 in the setting value table 502 of the RAM 102 and also display the setting screen where the setting value is set on the LCD display unit 401.

A case where the CPU 101 obtains the setting value of the color mode stored in the HDD 104 in S301 will be described as an example. In S204, the CPU 101 stores the setting value in the RAM 102 and displays the setting screen where the setting value stored in the HDD 104 is set with regard to the color mode on the LCD display unit 401. The CPU 101 displays the setting screen where the setting value of the color mode is set on the LCD display unit 401. Thereafter, the CPU 101 proceeds to S307, and it is determined whether or not the restoration processing is performed with regard to the setting items.

As described above, according to the third exemplary embodiment, with regard to the setting items including the sending destination, the processing after the user logs in again can be selected by the user from "restore", "no restoration", and "inquire the user". The user can select the setting item where the setting of the setting value is automatically performed, and usability for the user is improved.

Other Exemplary Embodiments

According to the first to third exemplary embodiments, the case has been described where the user uses the FAX/send function, but the same also applies to the other functions of the image processing apparatus such as copying and printing. For example, it is assumed that, in the copying function and the printing function, the number of copies displays a value set as a default setting value when the user logs in again instead of the number of copies set at the time of the previous logout. For example, the default setting value for the number of copies is "1 copy", and the number of copies is set as "100 copies" at the time of the previous logout. At the time of the next login, the setting value other than the number of copies uses the setting value at the time of the previous logout. The number of copies is set as the default "1 copy" to be displayed on the LCD display unit 401. A configuration may be of course adopted in which previously determined settings may be used for the settings other than the settings according to the present exemplary embodiment such as, for example, settings of a scanning density, a resolution, color or black-and-white, and a magnification of copying.

In addition, according to the first and second exemplary embodiments, the setting screen of the function used at the time of the logout is displayed immediately after the user logs in again. However, after the user logs in again, the main menu screen 1500 may be displayed on the LCD display unit 401, and the setting screen where the setting value stored in the HDD 104 is set with regard to the function selected by the user may be displayed.

According to the first to third exemplary embodiments, the example has been described in which the setting value at the time of the logout is automatically set with regard to part of the setting items among the setting items, and the setting screen where the setting value at the time of the logout is not at least automatically set with regard to the other setting item is displayed on the LCD display unit 401. However, the reflection of the setting value with regard to the part of the setting items may be performed on the basis of the restoration instruction by the user or may be performed without depending on the restoration instruction of the user, and the reflection of the setting value may be prohibited with regard to the other setting item.

For example, the display of the setting screen where the sending destination that has been set at the time of the logout is set is prohibited in the FAX/send function in a case where the user logs in again. It is assumed that the user performs the setting with regard to the plurality of setting items including the sending destination related to the FAX/send function and logs out. In a case where the logged-out user logs in again, the display of the setting screen where the sending destination that has been set at the time of the logout is set with regard to the sending destination is prohibited. At this time, the setting screen where the setting at the time of the logout with regard to the other setting item except for the sending destination is displayed without depending on the instruction by the user in a case where the user logs in again. Alternatively, the user may be inquired on whether or not the setting value at the time of the logout is set in a case where the user logs in again.

Figure 15:
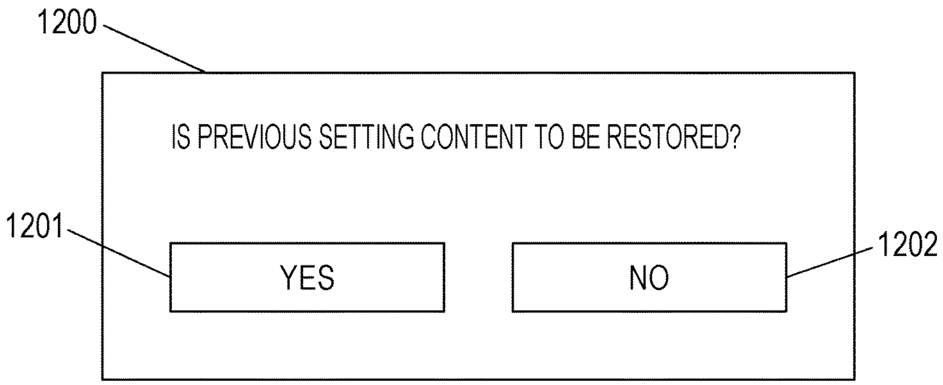
FIG. 15 illustrates an example of a setting value restoration selection screen displayed on the LCD display unit according to one or more aspects of the present disclosure.

When the user is inquired on whether or not the setting of the setting value is performed, the CPU 101 displays a setting value restoration selection screen 1200 as illustrated FIG. 15 or the like on the LCD display unit 401. In a case where the user selects a “yes” button 1201, the CPU 101 displays the setting screen where the setting value stored in the HDD 104 is set on the LCD display unit 401. In a case where the user selects a “no” button 1202, the CPU 101 displays the setting screen where the setting value stored in the HDD 104 is not displayed.

With the above-described configuration, it is possible to display the setting screen where the part of the setting items is excluded from the restoration target when the user logs in again. Therefore, it is possible to decrease the number of incidents that the user executes the job without noticing that the job setting screen on which the setting value at the time of the logout is set is displayed.

According to the present exemplary embodiment, in S117 to S119 of FIG. 2, the function type, the sending destination, and the other setting value at the time of the logout are stored in the HDD 104 in the image processing apparatus 100. In S117 to S119, the CPU 101 obtains the function type, the sending destination, and the other setting value at the time of the logout. Thereafter, the CPU 101 may send the obtained information to an information processing apparatus such as an external server connected via the network I/F 105. At this time, the information processing apparatus such as the external server receives the above-described information from the image processing apparatus 100 to be stored.

According to the first to third exemplary embodiments, the case has been described where the processing described with reference to FIG. 2 to FIG. 4 and FIG. 13 is performed by the CPU 101 in the controller unit 116 of the image processing apparatus 100. However, the CPU 101 that performs the processing does not necessarily need to exist in the controller unit 116 of the image processing apparatus 100. For example, a computer connected to the image processing apparatus may perform control of the image processing apparatus, and a CPU in the computer may perform the processing described according to the first to third exemplary embodiments.

According to the exemplary embodiments described in the present specification, the work for the setting of the setting value after the user logs in again is reduced by using the automatic setting value restoration function, and the part of the setting items is excluded from the reflection target, so that it is possible to decrease the probability that the job is executed with the setting that is not intended by the user with regard to the part of the setting items.

Embodiment(s) of the present disclosure can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-054387 filed Mar. 17, 2016, which is hereby incorporated by reference herein in its entirety.

What is claimed is:

1. An image processing apparatus comprising:

a scanner unit which reads an original to obtain an image;

a display unit which displays a setting screen of a job for performing setting of a plurality of setting items related to the job;

a memory that stores, in association with identification information about a user, setting values of the setting items related to the set job in accordance with logout of the user who has logged in to the image processing apparatus; and a control unit configured to perform control so as to read the setting values stored in the memory and display, on the display, the setting screen of the job to which the setting values are restored while a user having logged out logs in again, wherein the setting items include a transmission destination to which the image obtained by reading the original is transmitted, and the control unit does not restore, to the setting screen, a transmission destination set when the user logs out, and wherein the control unit is implemented by at least one processor.

2. The image processing apparatus according to claim 1, wherein the memory stores the setting values of the setting items related to the job including the transmission destination.

3. The image processing apparatus according to claim 2, wherein the display unit displays a screen for inquiring the user on whether or not the setting screen of the job where the setting value stored in the memory is set with regard to the transmission destination is displayed.

4. The image processing apparatus according to claim 1, wherein the memory stores the setting value of the setting item related to the job excluding the transmission destination.

5. The image processing apparatus according to claim 1, wherein the control unit performs the control so as to display the setting screen of the job where the setting values stored in the memory are set when the user logs in to the image processing apparatus.

6. The image processing apparatus according to claim 1,
wherein the memory stores a function displayed on the display unit when the user logs out, and
wherein the control unit displays a setting screen of the job of the function stored in the memory.

7. The image processing apparatus according to claim 1,
wherein the display unit can display a function selection screen for selecting a function to be used by the user when the user logs in to the image processing apparatus, and
wherein the control unit displays the setting screen of the job where the setting value stored in the memory is set in accordance with the selection of the function on the function selection screen.

8. A control method for an image processing apparatus, the control method comprising:
reading an original to obtain an image;
displaying a setting screen of a job for performing setting of a plurality of setting items related to the job;
storing, in association with identification information about a user, setting values of the setting items related to the job in accordance with logout of the user who logs in to the image processing apparatus; and
performing control so as to read the setting values stored in the memory and display the setting screen of the job to which the setting values are restored while a user having logged out logs in again,
wherein the setting items include a transmission destination to which the image obtained by reading the original is transmitted, and a transmission destination set when the user logs out is not restored to the setting screen.

9. A non-transitory storage medium storing a program for executing a control method for an image processing apparatus, the control method comprising:
displaying a setting screen of a job for performing setting of a plurality of setting items related to the job;
storing, in association with identification information about a user, setting values of the setting items related to the job in accordance with logout of the user who logs in to the image processing apparatus; and
performing control so as to read the setting values stored in the memory and display the setting screen of the job to which the setting values are restored while a user having logged out logs in again,
wherein the setting items include a transmission destination to which the image obtained by reading the original is transmitted, and a transmission destination set when the user logs out is not restored to the setting screen.

* * * * *